UNITED STATES PATENT OFFICE.

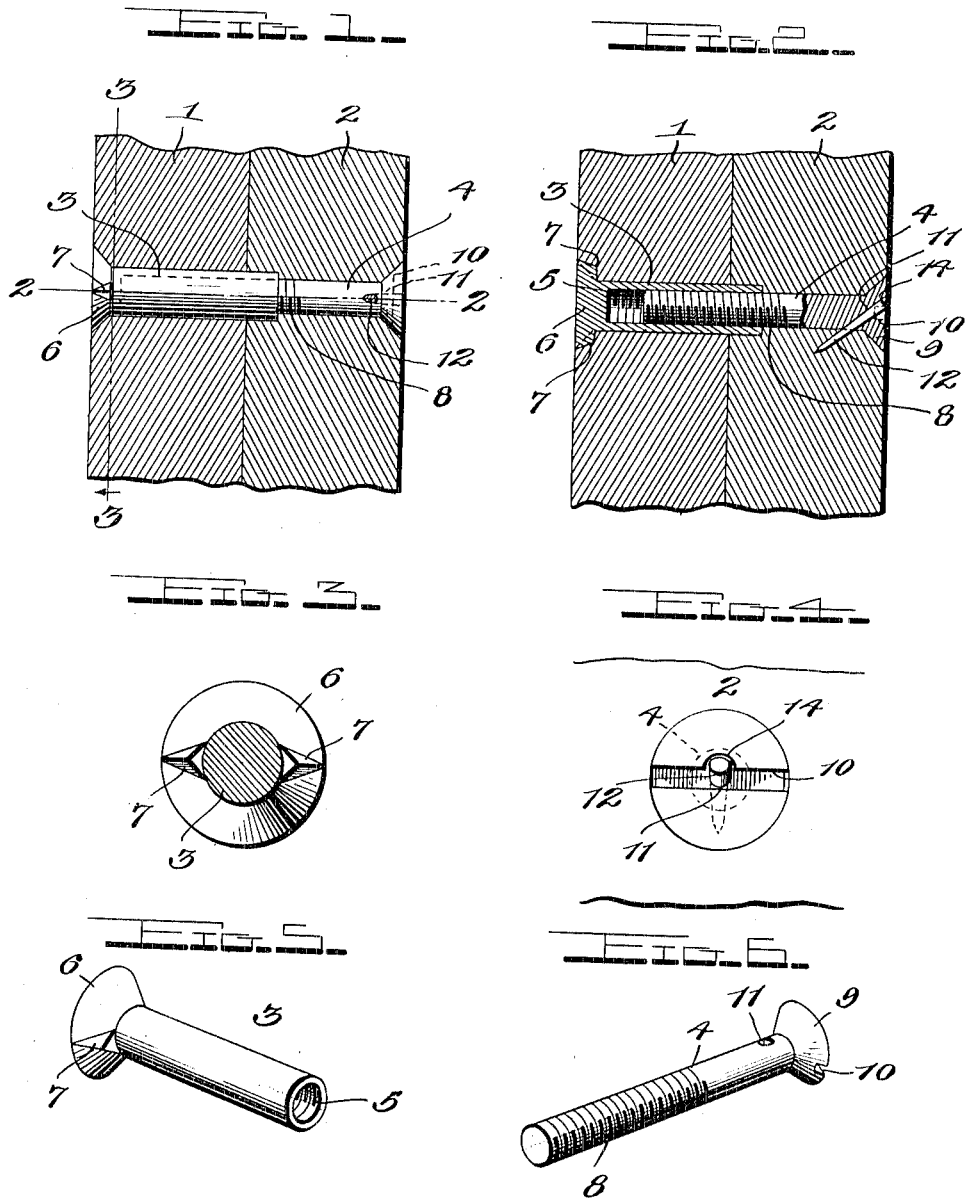
C. A. FORD.
NUTLESS BOLT.
APPLICATION FILED JUNE 11, 1913.
1,084,850.
Patented Jan. 20, 1914.

CHARLES A. FORD, OF NEWARK, NEW JERSEY.

NUTLESS BOLT.

1,084,850.　　　　　　Specification of Letters Patent.　　　Patented Jan. 20, 1914.

Application filed June 11, 1913. Serial No. 773,038.

*To all whom it may concern:*

Be it known that I, CHARLES A. FORD, citizen of the United States, residing at Newark, in the county of Essex and State of New Jersey, have invented certain new and useful Improvements in Nutless Bolts, of which the following is a specification.

The present invention relates to a nutless bolt and has for its primary object to provide a device of this character which is especially adapted for use in the repairing of furniture and the like, and which embodies novel features of construction whereby all projecting nuts or like parts are eliminated and also whereby the bolt may be securely locked in position so that it is impossible for the parts to work loose.

Further objects of the invention are to provide a nutless bolt which is simple and inexpensive in its construction, which can be readily placed in position, and which after once being applied can not be removed without breakage, thereby insuring that the parts will be held securely together and will not work loose even under continual vibration.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a sectional view through two blocks or members connected by one of the nutless bolts, the said nutless bolt appearing in side elevation. Fig. 2 is a sectional view on the line 2—2 of Fig. 1. Fig. 3 is a sectional view on the line 3—3 of Fig. 1. Fig. 4 is a plan view of the head of the screw member, showing the locking brad in position. Fig. 5 is a detail perspective view of the sleeve member, and Fig. 6 is a similar view of the screw member.

Corresponding and like parts are referred to in the following description and indicated in all the views of the drawings by the same reference characters.

Referring to the drawings, the numerals 1 and 2 designate two members, such as blocks of wood, which it may be desired to secure together. The headless bolt comprises a pair of complemental members 3 and 4 which are designed to be inserted through corresponding openings in the members 1 and 2 and to have a threaded engagement with each other. The complemental member 3 is in the form of a sleeve which is interiorly threaded at 5. The outer end of the sleeve is closed and provided with a beveled head 6 which is adapted to be counter-sunk in the member 1 so as to be flush with the outer face thereof and eliminate all projections. The beveled under face of the head 6 is provided with laterally projecting wings or teeth 7 which serve to bite into the wood or material of which the member 1 is composed so as to securely lock the sleeve member 3 against rotation.

The complemental member 4 has the end thereof threaded at 8 for engagement with the interior threads 5 of the sleeve 3. The outer end of the member 4 is provided with a beveled head 9 which is similar to the beveled head 6 of the member 3 and is adapted to be counter-sunk in the outer face of the member 2 so as to be flush therewith. This head 9 is constructed with a kerf 10 which can be engaged by a screw-driver for the purpose of screwing the end of the member 4 into the sleeve 3 and drawing the members 1 and 2 tightly together. An axially inclined opening 11 is formed in the outer end of the screw member 4, one end of the said opening 11 opening through one side of the screw 4 while the opposite end thereof communicates with the kerf 10. A small nail or brad 12 is designed to be driven through this inclined opening or passage 11 so as to lock the screw member 4 against rotation after it has been screwed into the sleeve 3 and the members 1 and 2 thereby tightly clamped together. As indicated by Fig. 4, one side of the kerf 10 may be provided with a notch 14 in alinement with the opening or passage 11 to receive the head of the brad 12 and facilitate driving of the brad into position. After the complemental members 3 and 4 of the nutless bolt have been drawn tightly together and the locking brad 12 driven into position, a permanent fastening is obtained, since neither of the members 3 and 4 can rotate or work loose. A tight joint will thus be maintained even though the parts be subjected to a constant vibration.

Having thus described the invention, what

I claim as new and desire to secure by Letters Patent, is:—

1. A bolt fastening member including an interiorly threaded sleeve provided at the outer end thereof with a head, means for locking the sleeve against rotation, a screw member adapted to be threaded into the sleeve and provided at the outer end thereof with a head, said head having a kerf therein and being provided with an axially inclined opening communicating with the kerf, and a brad adapted to be driven through the axially inclined opening so as to project upon one side of the screw member and lock the screw member against rotation.

2. A bolt fastening including an interiorly threaded sleeve provided at the outer end thereof with a head, means for locking the sleeve against rotation, a screw member adapted to be threaded into the sleeve and provided at the outer end thereof with a head, said head having a kerf therein and being provided with an axially inclined opening communicating with the kerf, a notch being provided in one side of the kerf in alinement with the opening, and a brad adapted to be driven through the opening so as to project beyond the side of the screw and lock the same against rotation, the head of the brad being adapted to be seated within the notch.

In testimony whereof I affix my signature in presence of two witnesses.

CHARLES A. FORD.

Witnesses:
HENRY BOSSET,
R. C. MILL.